United States Patent
Fukuyama et al.

(10) Patent No.: US 7,392,530 B2
(45) Date of Patent: Jun. 24, 2008

(54) DISK DRIVE DEVICE, DISK DRIVE SYSTEM AND DISK

(75) Inventors: Masahiro Fukuyama, Kanagawa (JP); Tetsuji Fukuyama, Kanagawa (JP)

(73) Assignee: HIRO 21 Corporation, Yokohama (JP)

( * ) Notice: Subject to any disclaimer, the term of this patent is extended or adjusted under 35 U.S.C. 154(b) by 181 days.

(21) Appl. No.: 11/030,541

(22) Filed: Jan. 6, 2005

(65) Prior Publication Data

US 2005/0155051 A1    Jul. 14, 2005

(30) Foreign Application Priority Data

| Jan. 9, 2004 | (JP) | ............................. 2004-004301 |
| Jan. 22, 2004 | (JP) | ............................. 2004-013995 |
| Feb. 4, 2004 | (JP) | ............................. 2004-027685 |

(51) Int. Cl.
G11B 17/028    (2006.01)

(52) U.S. Cl. ..................................... 720/706

(58) Field of Classification Search ................ 720/706; 360/48; 369/70; 726/30; 711/112
See application file for complete search history.

(56) References Cited

U.S. PATENT DOCUMENTS 5,465,381 A * 11/1995 Schmidt et al. ............. 711/112
5,652,838 A * 7/1997 Lovett et al. .................. 726/30
6,181,662 B1 * 1/2001 Krieger et al. ................ 369/70
6,504,663 B2 * 1/2003 Hirano et al. ................. 360/48

FOREIGN PATENT DOCUMENTS

| JP | 05-054460 | 3/1993 |
| JP | 11-16325 | 1/1999 |
| JP | 11-353729 | 12/1999 |
| JP | 11-353749 | 12/1999 |
| JP | 2000-100031 | 4/2000 |
| JP | 2000-100032 | 4/2000 |
| JP | 2000-285636 | 10/2000 |

* cited by examiner

*Primary Examiner*—Tianjie Chen
(74) *Attorney, Agent, or Firm*—Straub and Pokotylo; John C. Pokotylo

(57) ABSTRACT

A disk 100 has an electronic circuit 10 for executing predetermined signal process and/or an electronic function part having a function of generating, writing or preserving some electronic data and at least one electrical conductive part 20 electrically connected to the electronic circuits and/or electronic function part. The disk 100 is to be set on the turntable 210, clamped by the clamp and driven for rotation for reading or writing data. The clamp has an electrical conductive part formed on locality corresponding to the electrical conductive part 20 of the disk 100.

16 Claims, 14 Drawing Sheets

DISK DRIVE DEVICE, DISK DRIVE SYSTEM AND DISK

BACKGROUND OF THE INVENTION

This application claims benefit of Japanese Patent Application Nos. 2004-004301, 2004-013995 and 2004-027685 filed on Jan. 9, 2004, Jan. 22, 2004 and Feb. 4, 2004, respectively, the contents of which are incorporated by the reference.

The present invention relates to disk drive devices, disk drive systems and disks capable of signal transmission and/or receipt between disk and disk drive device with a simple arrangement.

Optical disks, although made of very inexpensive materials such as polycarbonate or like resins, are capable of recording very great amounts of data quantities and also very advantageous in view of the cost performance. Thus, the optical disks are most promising as future recording medium.

For reading out and writing data from and in an optical disk (data read/write), a disk drive device is used. The disk drive device is arranged such that an optical disk is set on a turntable, clamped by a clamp and driven for rotation by a spindle motor that the disk in this state is irradiated by a laser beam, and that a reflected beam from the disk surface is received and demodulated, thereby reading out the recorded data. Typical examples of such disk drive device arrangement are disclosed in Literatures 1 to 3 (see Japanese Patent-Laid Open Heisei 11-353749, Japanese Patent-Laid Open 2000-100031 and Japanese Patent-Laid Open 2000-100032).

Recently, such optical disks have been proposed that not only a recording area but also an electronic circuit or like electric circuit is formed thereon. However, due to the fact that the optical disk and the disk dive device are operable in a state of being perfectly electrically insulated from each other and also that the optical disk is driven for rotation at a high speed it is not so easy to carry out signal transmission and/or receipt between the electronic circuit formed on the optical disk and an internal circuit formed on the side of the disk drive device.

What utilizes radio signal as signal transmitted and received between the disk side and disk drive side, has been proposed as disk drive device of the pertaining type for driving the optical disk. As an example, the optical disk surface and the disk drive surface are each formed with an antenna for radio signal transmission and/or receipt via these antennas.

It has also been conceived to form each of the optical drive side and the disk drive with a light emitting/receiving circuit for optical signal transmission and/or receipt via these light emitting/receiving circuits.

In a further proposed arrangement, signal transmission and/or receipt between the electronic circuit and the disk drive side is carried out in a state that the disk drive is held stationary (see Literature 4: U.S. Pat. No. 5,119,353).

As shown above, in the prior art the transmission and/or receipt of signals between the electronic circuit formed on the disk surface and the internal circuit in the disk drive device, is carried out as the radio signal transmission and/or receipt via the antennas formed on the disk surface and the disk drive side, respectively. However, such antennas should be formed with shape parameters fitted for the radio signal frequency, and also the formation of the antenna on the disk surface requires a highly accurate etching (forming) technique. Furthermore, it is necessary to form a frequency converter circuit for frequency conversion to and from the radio frequency. These facts are significant problems for the optical disk, the low cost of which is greatly beneficial. Furthermore, the radio frequency transmission and/or receipt characteristic is easily influenced or deteriorated by metal materials close to the transmission/reception means such as the reflected metal layer in the disk.

In the case of the arrangement adapted for optical signal transmission and/or receipt via the light emitting/receiving circuits formed on the optical disk side and the disk drive device side, respectively, it is necessary to form an optical/electric signal converter circuit on each disk, which is a significant problem likewise for the optical disk featuring utmost preference in cost.

In the case of carrying out the signal transmission and/or receipt between the electronic circuit and the internal circuit on the disk drive device side in the state that the disk drive device is held stationary, the signal transmission and/or receipt between the disk circuit and the disk drive device side can not be obtained while the disk is driven for rotation, and real-time signal processing is impossible.

In the meantime, it is presumed to form not only a single but plurality of electronic circuits on the disk. In the prior art, it is impossible to cope with transmission and/or receipt of signals with respect to the disk drive device under such presumption. Foe example, it is very difficult to supply the electric power to the electric circuit on the disk.

SUMMARY OF THE INVENTION

An object of the present invention is to provide a disk drive device, a disk drive system and a disk capable of transmission and/or receipt of signals between the disk side and the disk drive device side at low cost and with a simple arrangement.

Another object of the present invention is to provide a disk drive device, a disk device system and a disk capable of transmission and/or receipt of electric signals between the disk and an external device and also permits greatly improving the property of expansion in the fields of disk utilization at low cost.

A further object of the present invention is to provide a disk drive device, a disk drive system and a disk capable of transmission and/or receipt of a plurality of signals between the disk side and the disk drive side at low cost and with simple arrangement.

By the term "transmission and reception" is meant the status of exchange of all electric data, signal, power, etc. such as "transmission", "reception" and "transmission and reception". By the term "or" is meant not only one of two but technically also "and" meaning coexistence of the two. The term may be used in this sense in the specification and also the scope of claims.

According to an aspect of the present invention, there is provided a disk drive device comprising a disk, a turntable and a clamp, wherein: the disk has an electronic circuit for executing predetermined signal process and/or an electronic function part having a function of generating, writing or preserving some electronic data and at least one electrical conductive part electrically connected to the electronic circuit and/or electronic function part, the disk being to be set on the turntable, clamped by the clamp and driven for rotation for reading or writing data; and the clamp has an electrical conductive part formed on locality corresponding to the electrical conductive part of the disk.

According to another aspect of the present invention, there is provided a disk drive device comprising a disk, a turntable and a clamp, wherein: the disk has an electronic circuit for executing predetermined signal process and/or an electronic function part having a function of generating, writing or preserving some electronic data and at least one electrical conductive part electrically connected to the electronic circuit or electronic function part, the disk being to be set on the turntable, clamped by the clamp and driven for rotation for reading or writing data; and the turntable has an electrical conductive part formed on locality corresponding to the electrical conductive parts of the disk.

According to other aspect of the present invention, there is provided a disk drive device comprising a disk, a turntable and a clamp, wherein: the disk has an electronic circuit for executing predetermined signal process or an electronic function part having a function of generating, writing or preserving some electronic data and at least one electrical conductive part electrically connected to the electronic circuit and/or electronic function part, the disk being to be set on the turntable, clamped by the clamp and driven for rotation for reading or writing data; the clamp has an electrical conductive part formed on locality corresponding to the electrical conductive part of the clamp; and the turntable has an electrical conductive part formed on locality corresponding to the electrical conductive part of the clamp.

The electrical conductive part on the clamp or on the turntable is constituted by a plurality of electrically connected spaced-apart electrical conductive parts. The electrical conductive part on the clamp or on the turntable is electrically connected to an internal electric circuit side. The electrical conductive part on the clamp or on the turntable is connected radio-wise to an internal electric circuit side. The electrical conductive part on the clamp or on the turntable is connected optical-wise to the internal electric circuit side.

According to still other aspect of the present invention, there is provided a disk drive device operable with a disk and a disk device side disk holder means, wherein: the disk is to be held in contact by the disk drive side disk holder means and has an electronic circuit for executing predetermined signal process and/or an electronic function part having a function of generating, writing or preserving some electronic data and also has its locality held in contact by the disk holder means formed with an electrical conductive part electrically in contact with the electronic circuit and/or electronic function part, or an electrical conductive part of the electronic circuit or electronic function part, the disk being to be rotated in union with the disk holder means for reading or writing data from or in the disk; the disk holder means having an electrical conductive part to be electrically connected to the electrical conductive part of the disk; and signal is transmitted and received between the disk side electronic circuit and/or electronic function part and the disk drive side via the electrical conductive part on the disk side and on the disk drive side.

According to further aspect of the present invention, there is provided a disk drive device comprising a disk, a disk drive side turntable and a disk drive side clamp, wherein: the disk is to be set on the turntable and clamped by the clamp, and has an electronic circuit for executing predetermined signal process and/or an electronic function part each having a function of generating, writing or preserving some electronic data and also its locality clamped by the clamp formed with an electrical conductive part electrically connected to the electronic circuit and/or electronic function part, or an electrical conductive part of the electronic circuit and/or electronic function part, the disk being rotated in union with the disk drive side for reading out or writing data from or in it; the turntable having an electrical conductive part to be electrically connected to the electrical conductive part of the disk, when the disk is clamped; and signal is transmitted and received between the disk side electronic circuit and/or electronic function part and the disk drive side via the electrical conductive parts on the disk side and on the disk drive side.

According to still further aspect of the present invention, there is provided a disk drive system comprising a disk and a disk drive side, wherein: the disk is formed with an electric conductive part and to be held by a holder means on the disk drive side in contact with it; the disk drive side is formed on its surface to be in contact with the disk with an electrical conductive part to be electrically connected to the electrical conductive part of the disk; and signal is transmitted and received between the disk drive side and the disk via the electrical conductive parts on the disk drive side and on the disk.

According to other aspect of the present invention, there is provided a disk drive system comprising a disk and a disk drive side including a holder means, wherein: the disk has an electronic circuit for executing predetermined signal process and/or an electronic function part having a function of generating, writing or preserving some electronic data and an electrical conductive part electrically connected to the electronic circuit and/or the electronic function part, and to be held in contact by the disk drive side holder means, and the disk drive side has its contact surface formed with an electrical conductive part to be electrically connected to the electrical conductive part of the disk, respectively; and signal is transmitted and received between the disk drive side and the disk via the electrical conductive parts on the disk drive side and on the disk.

According to still other aspect of the present invention, there is provided a disk having a data storage area and to be held in contact with a disk drive side disk holder means for rotation in union therewith; wherein: the disk has an electronic circuit for executing predetermined signal process and/or an electronic function part having a function of generating, writing or preserving some electronic data; and the disk drive side disk holder means has an electrical conductive part to be electrically connected to the electronic circuit.

According to further aspect of the present invention, there is provided a disk to be set on a turntable on disk drive side and clamped by a clamp thereon for rotation in union with the disk drive side and having an electronic circuit for executing predetermined signal process and/or an electronic function part having a function of generating, writing or preserving some electronic data, wherein: the clamped disk locality is formed with an electrical conductive part electrically connected to the electronic circuit and/or electronic function part.

Other objects and features will be clarified from the following description with reference to attached drawings.

PREFERRED EMBODIMENTS OF THE INVENTION

Preferred embodiments of the present invention will now be described with reference to the drawings.

The following description concerns embodiments using optical disk as the disk, the present invention is applicable as well to any other disk such as optical and electromagnetic disks, irrespective of the record/write method (e.g., CD, DVD, MO, FD, HDD, etc.) so long as the disk is driven for rotation by being held on a disk drive device and clamped by a clamping means. In a broader sense, the present invention is applicable, like the case between the disk and the disk drive device, to the case between a rotational member and a rotating device, which drives for rotation the rotational member in contact with it and held (or clamed) by a hold (or clamp) member. The following description is restricted to the case between the disk and the disk drive device as a typical example.

FIGS. 1 to 4 are schematic plan views showing the arrangement of optical disk 1 embodying the present invention. FIGS. 5 to 8 are fragmentary schematic sectional views showing arrangements of disk drive device embodying the present invention.

Figure 1:
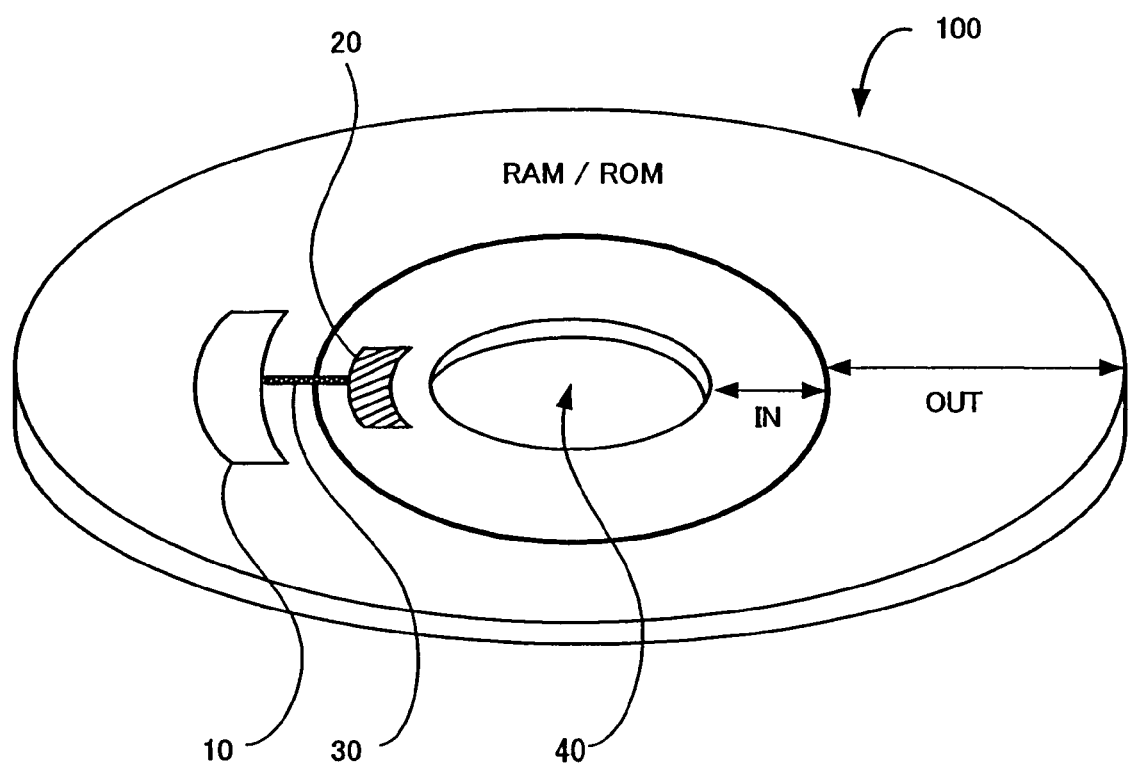
FIG. 1 shows schematic plan view of an optical disk according to an embodiment of the present invention.

Referring to FIG. 1, an optical disk 100 has an outer peripheral part OUT of its surface formed with data storage areas, i.e., a RAM area (or data storage part), in which such data as images, music, etc. are stored, and a ROM area (for instance a program storage area) in which a predetermined program is stored. The outer peripheral part OUT includes an electronic circuit 10 for executing signal processes, for example based on the program stored in the memory such as ROM area and the program in the electronic circuit. The electronic circuit 10 may be any electronic or electric function parts such as signal processing circuit, memory, battery and others. In this embodiment, the optical disk 100 has an inner peripheral part (usually transparent part but possibly semi-transparent or opaque part) IN, which is a locality to be held in contact with a hold/clamp (or chucking) mechanism of the disk drive device, is formed with an electric conductive part 20. The electronic circuit 10 provided on the outer side OUT, and the electric conductive part 20 provided on the inner side IN, are electrically connected via a connecting part (line) 30 to each other.

The electronic circuit 10 may be provided at any locality. The optical disk is held with a relatively high contact force (clamp pressure) by the clamp (or chucking) mechanism of the disk drive device 200. It is preferably to avoid the adverse advantages of the close contact force, the electronic circuit 10 is thus preferably provided at a non-clamped locality outside the inner peripheral part. However, in the case of an arrangement free from any problem from the clamp pressure (for instance in the case of burying the electronic circuit in the disk), the electronic circuit 10 may be provided in the inner peripheral part IN as will be described later. Furthermore, the electric conductive part 20 may of course be provided in the same locality as the electronic circuit 10 such that, for instance, it is included therein.

Figure 2:
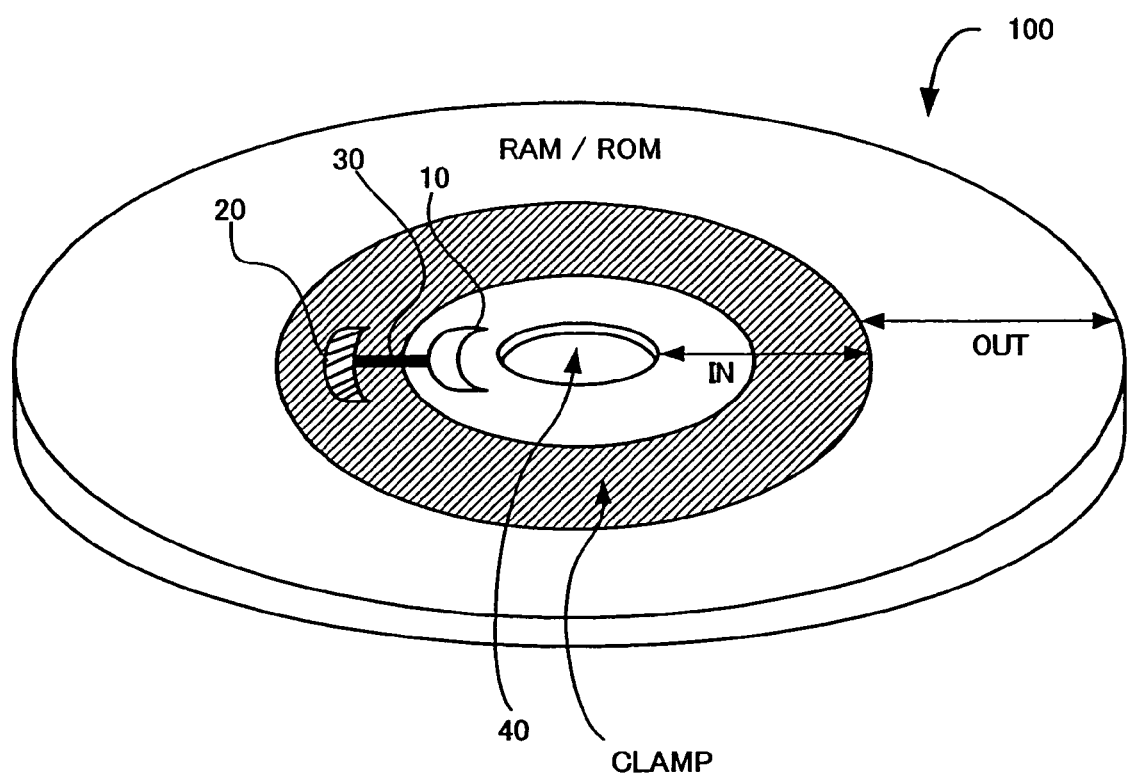
FIG. 2 shows schematic plan view of an optical disk according to another embodiment of the present invention.

As an example, as shown in FIG. 2, it is possible to form the electric conductive part 20 in a clamp part (or hold or grasp part as shown shaded) CLAMP in the inner peripheral part IN of the optical disk 100 and form the electronic circuit 10 in a locality, which is peripherally inner than the clamp part CLAMP so that it is not in direct contact with the clamp (or hold or grasp part) and free from clamp pressure reception.

Figure 3:
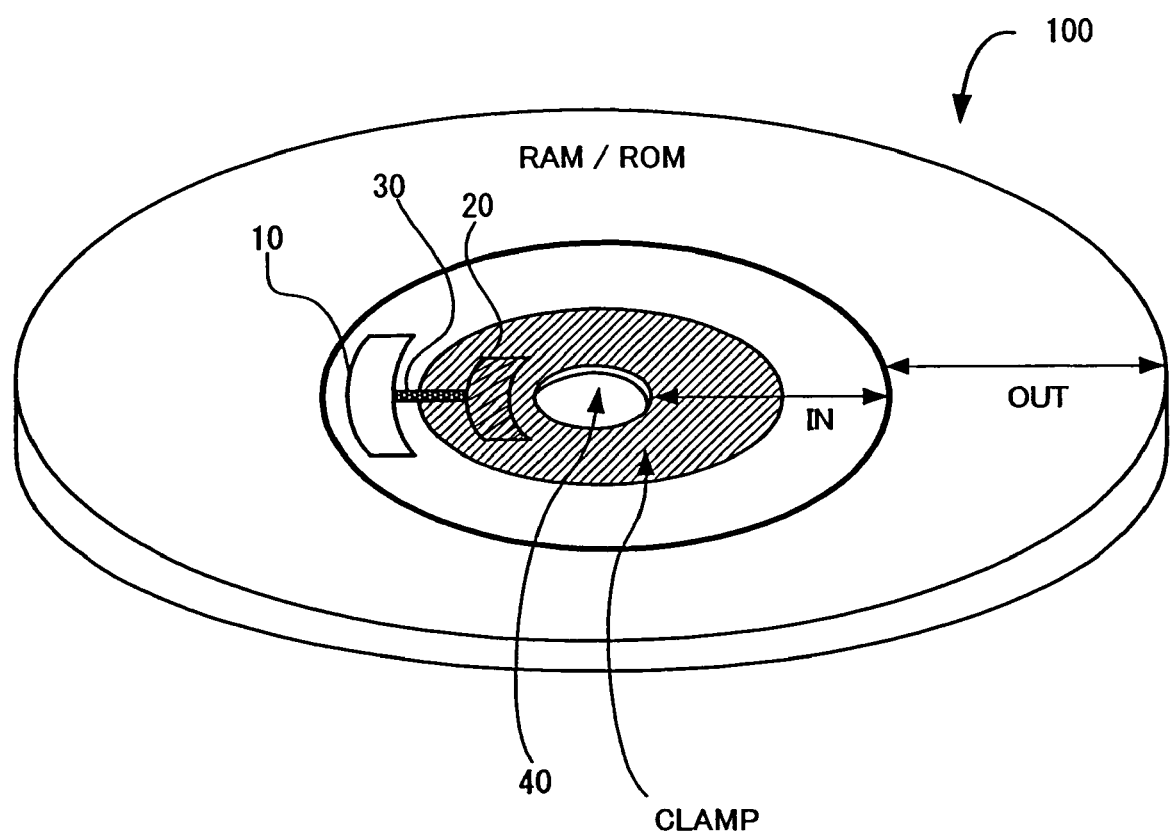
FIG. 3 shows schematic plan view of an optical disk according to other embodiment of the present invention.

FIG. 3 shows a further example, in which the electrical conductive part 20 is formed on a clamp part (or holder or grasp part as shown shaded) on the inner side of the inner peripheral part IN of the optical disk 100, while the electronic circuit 10 is formed on a locality other than the outer peripheral part OUT and the clamp part CLAMP in the inner peripheral part IN.

Figure 4:
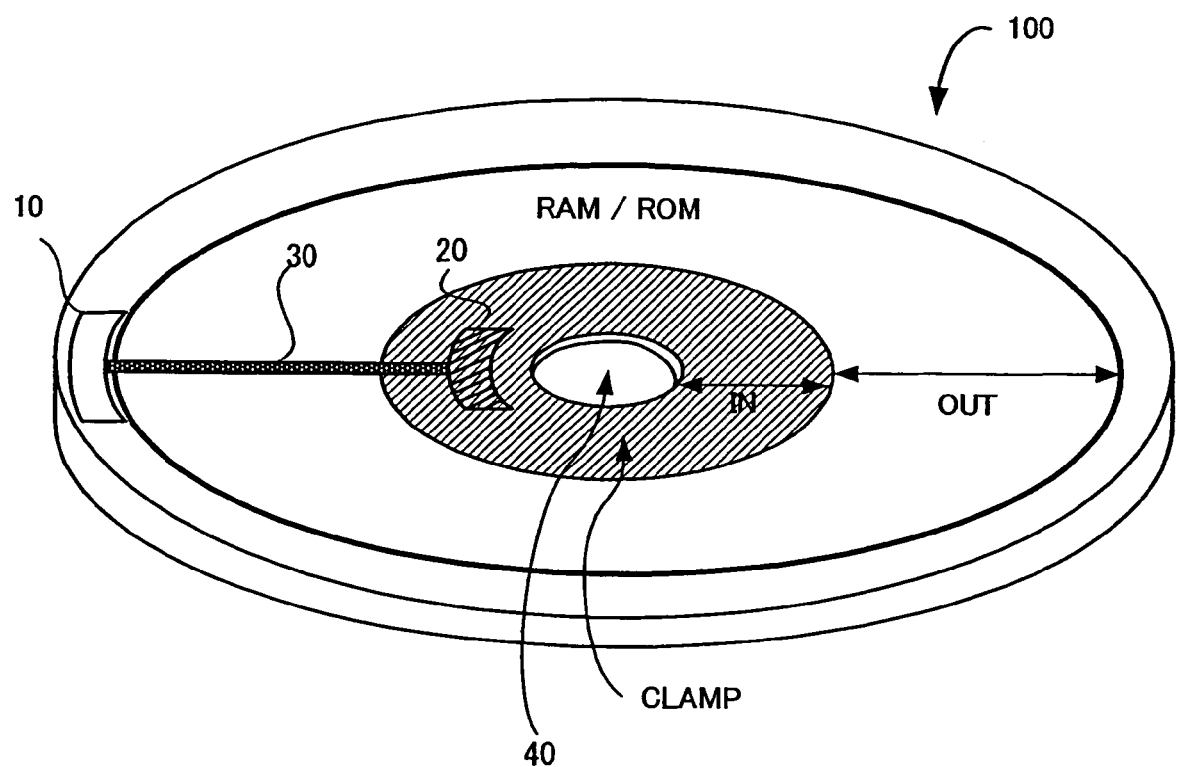
FIG. 4 shows schematic plan view of an optical disk according to other embodiment of the present invention.

FIG. 4 shows a further example, in which the electrical conductive part 10 is formed on a clamp part (or hold or grasp part as shown shaded) CLAMP as the inner peripheral part IN of the optical disk 100, while the electronic circuit 10 is formed on a part peripherally outer than the outer peripheral part OUT, which is normally not used as any data storage area. The electronic circuit 10 and the electrical conductive part 20 are connected by the electric connecting part 30 to each other. The electronic circuit 10 may of course be formed in the data storage are as well.

The electronic circuit 10 may serve to execute a predetermined operation process, for example, based on programs stored in the ROM area of the optical disk or any other memory, and the results of the processes is transmitted in a form to be described hereinunder to the side of the disk drive device 200. The electronic circuit 10 serves to receive signals from the side of the disk drive device 200.

Among the above predetermined processes executed by the electronic circuit 10 are one, in the case of ciphered data stored in the storage part, in which the ciphered data are read out and de-ciphered based on a program stored in the ROM area or other storage area (memory). For writing data by ciphering the same, the data can likewise be ciphered on the basis of ciphering program stored in the data storage part or in other memory.

In this case, by prescribing the ciphering and de-ciphering programs for each optical disk, peculiar closed signal processes are possible for each optical disk. Thus, in a process other than the peculiar closed processes, it is made difficult to access the disk, thus ensuring high security. Still higher security can be ensured by arranging such that a key for the de-ciphering can be separately externally preset. Furthermore, it is possible to permit execution processes on the basis of programs stored in the ROM area and also permit storing the results of processes executed in external process circuits. With this arrangement, the process results will not remain in external process devices but are preserved and stored in the sole RAM area or other memory as the data storage part of the optical disk. Besides, by arranging such that data to be preserved or stored are subject to such preliminary process of ciphering or the like in the electronic circuit, the third party can not obtain the de-ciphered data unless a de-ciphering program including key data for de-ciphering the ciphered data is available, and a very high security system thus can be realized. Moreover, with the signal transmission and/or receipt between the electronic circuit formed on the optical disk and the external circuit or the like, it is possible to obtain outstanding expansion of utilization fields which have not heretofore been considered.

As the electrical conductive part 20, a thin film one may be formed in the inner peripheral part of the optical disk 100. This electrical conductive part 20 may be electrically connected via the connecting part 30 (which is likewise formed by thin film formation on the surface of the optical disk 100) to the electronic circuit 10, or it may have a predetermined data. For example, by providing some data of the optical disk (such as data peculiar to the disk) to the electrical conductive part 20, it is possible to obtain such data directly from the disk. Also, it is possible to form, in lieu of the electronic circuit, an electronic function part having functions of generating, writing or preserving some electronic data. Furthermore, the electrical conductive part itself may include such an electronic function part and/or an electronic circuit as to generate some data. Conversely, the electrical conductive part may be included in an electronic function part and/or an electronic circuit. The electronic function part and/or the electronic circuit may not be provided. The electrical conductive part may be formed in the same surface as the data storage area formation surface of the disk, or it may be formed on the opposite side surface. The formation on the opposite side surface is advantageous because of the freedom from any consideration with respect to the data storage area. Moreover, it is of course possible to form the electronic circuit and the electronic function part. The electronic circuit and/or the electronic function part may be formed on both sides of the disk. In this case, both circuits may be operable and one of the circuits may be operable.

Figure 5:
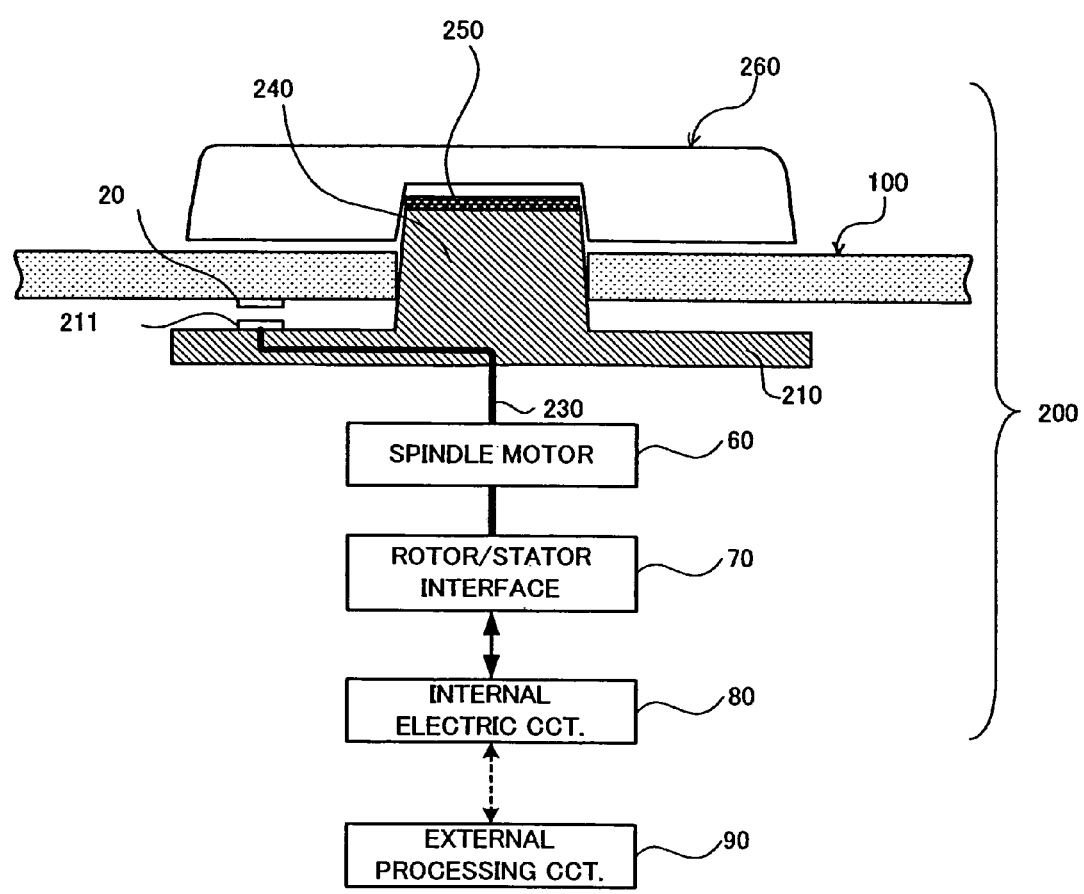
FIG. 5 is a schematic fragmentary sectional view for describing the arrangement of an optical disk drive device according to an embodiment of the present invention.

FIG. 5 is a schematic fragmentary sectional view for describing the arrangement of an optical disk drive device as an embodiment of the present invention.

Referring to FIG. 5, the optical disk 100 is set on a turntable 210 of a disk drive device 200, clamped by a clamp 260 and driven for rotation by a spindle motor 60. Usually the data storage area on storing data is formed not on the inner peripheral part IN but on the outer peripheral part OUT of the optical disk 100. The inner peripheral part IN is a transparent part or a semi-transparent or opaque part, and is used solely as locality to be clamped. In this embodiment, the electrical conductive part 20 is formed on the inner peripheral part IN.

The disk drive device 200 embodying the present invention will now be described with reference to FIG. 5. The turntable 210 is secured to the shaft 230 of the spindle motor 60, and has a central protrude portion 240, which is fitted in a central hole 40 of the optical disk 100 formed in a central part thereof. The optical disk 100 is set on the turntable 210 with its center position determined by the fitting of its central hole 40 on the protrude portion 240 of the turntable 210. The protrude portion 240 usually has a permanent magnet 250 provided at its top. The turntable 210 has an electrical conductive part 211 formed on its surface at a position thereof facing the electric conductive part 20 of the optical disk 100. FIG. 5 is a simplified illustration for facilitating the understanding. For example, the electrical conductive parts 20 and 211 are drawn on an enlarged scale compared to the optical disk 100 and other constituent elements. Actually, however, these electrical conductive parts 20 and 211 are constituted by a thin film, and their thickness can be substantially ignored.

The clamp 260 is disposed above the optical disk 100, and it has a magnetic part (not shown), which is provided at a position to face the permanent magnet 250 provided on the top of the protrude portion 240 of the turntable 210 and withdrawn by the magnetic force of the permanent magnet 250. By bringing the disk 100 set on the turntable 210 closer to the clamp 260, the clamp 260 is closely contacted with the turntable 210 via the optical disk 100 by the magnetic forces of the permanent magnet 250 and the magnetic member. The optical disk 100 is thus held and clamped (i.e., chucked) in the concentric state to be ready for being driven for rotation with the rotation of the shaft 230 of the spindle motor 60. In this embodiment, the clamp 260 is rotated in union with the turntable 210. As an alternative it is possible to provide the clamp 260 with a cavity or like space and provide a magnetic member in the space such as to be able to be magnetically closely attached to the permanent magnet 250 and freely rotated in union there with in the space. By the term "clamping" is meant all means for holding or grasping the disk as rotor in contact therewith for rotating the same.

While the spindle motor 60 is shown as an independent motor, this is so because the illustration is schematic. In many usual cases, a thin flat motor arrangement such as a rotational mechanism including a stator and a rotor is used, in which the turntable 210 is rotated around the shaft 230 by a magnetic action between a magnet provided on the turntable 210 and a coil or the like provided in the neighborhood of the magnet. In this case, the signal transmission path can be made simpler. A specific example of such arrangement will be described later.

In this case, the electrical conductive part 20 of the optical disk 100 and the electrical conductive part 211 of the turntable 210 in the disk drive device 200 are magnetically held in close contact with each other, and reliable electric connection can be maintained. Thus, the optical disk 100 and the turntable 210 (i.e., electrical conductive part 211) in the disk drive device 200 which is independent of the optical disk 100, are electrically connected to each other. Of course, the place of connection between the disk drive device 200 and the electrical conductive part 20 of the optical disk 100 is not limited to the turntable 210, but maybe any locality rotatable in union with and electrically connected to the optical disk 100. For example, it is possible to form an electrical conductive part in a locality of the clamp 260 corresponding in position to the electrical conductive part 20 of the optical disk 100.

With this arrangement, the electronic function part of the electronic circuit 10 of the optical disk 100 and the internal electric circuit on the side of the disk drive device 200, are electrically connected via the electrical conductive parts 20 and 211 to each other.

The disk drive device 200 reads out the data stored in the optical disk 100 set on the turntable 210 by clamping the disk 100 with the clamp 260 and driving the disk for rotation. Conversely, the device can also write the data in the disk. In the disk drive device, as noted above the electrical conductive part 211 is provided on the locality corresponding to (i.e., in contact with) the electrical conductive part 20 of the optical disk 100, and the signal transmission and/or receipt are carried out between the electrical conductive parts 20 and 211. Since at this time the optical disk 100 is rotated in union with the turntable 210 and the clamp 260 on the side of the disk drive device 200, and the signal transmission between the two electrical conductive parts are electrically directly carried out.

The electrical conductive part 211 on the side of the disk drive device 200 is connected to an internal electric circuit (for example, signal processing circuit) 80. The electrical conductive part 211 and the internal electric circuit 80 can be connected in any connection form. For example, the electrical conductive part 211 can be connected via the shaft 230 (of course, using the electric conductive wire provided in and insulated from the shaft 230) of the spindle motor 60 for rotating the turntable 210 together with the optical disk 100 and a rotor/stator signal transmission/reception interface 70 for the transmission and/or reception of signals between a rotor such as the shaft 230 and a stator such as the body of the disk drive device 200 to the internal electric circuit 80.

As the rotor/stator signal transmission/reception interface 70 for the signal transmission and/or receipt between the rotor such as the shaft 230 and the internal electric circuit 80 of the stator on the side of the disk drive circuit 200, it is possible to use various well-known means. For example, it is possible to adopt a signal transmitting/receiving system based on slip ring.

It will be readily understood that a well-known arrangement is used as an electric connection arrangement of the route constituted by the electrical conductive part 20 of the optical disk 100, the electrical conductive part 211 on the side of the disk drive device 200, the shaft 230 and the rotor/stator signal transmission/reception interface 70 in the mentioned order. For example, the electrical conductive part 211 may be provided on an insulating part on the turntable 210, and as the route from the electrical conductive part 211 to the rotor/stator signal transmission/reception interface 70 an exclusive wiring form (such as an electrical path) may be formed, or any other connection form may be used (this also applies to the following embodiments.)

Also, for the signal transmission and/or receipt, it is possible to use, as the rotor/stator signal transmission/reception interface 70, a means for permitting radio or optical signal transmission and/or receipt between the electrical conductive part 211 on the side of the rotor (i.e., turntable 210) and the internal electric circuit 80 in the disk drive device 200. In this case, although slight cost increase is inevitable on the side of the disk drive device 2, it is unnecessary to provide a signal transmission and/or reception interface for each optical disk, and the merit of the low cost of optical disk can be sufficiently maintained.

Regarding the transmission and/or receipt of signals by the optical means, it is possible to reduce fluctuations of signal light due to rotation of the shaft of the spindle motor 60 by providing an electrical path along the axis of the spindle motor 60 for emitting (or receiving) signal light from (or at) the shaft and providing a means for receiving (or emitting) signal light from (or to) the shaft end. This also applies to the case signal transmission and/or receipt by the radio means.

The electrical conductive part 211 on the side of the disk drive device 200, which is brought into electric contact with the electrical conductive part 20 of the optical disk 100 at the clamping time, may be formed on both the turntable 210 and the clamp 260 for clamping the optical disk 100. With this arrangement, it is possible to cope with the case, in which the electrical conductive part formation surface is different with optical disks 100 and also with the case of optical disk 100 having electrical conductive parts (and the corresponding electric circuits) formed on both sides. The disk drive device may select both of the electronic circuits or the like or one of the circuits provided on both sides of the disk. This also applies to the description of the embodiments given hereinunder.

Although the rotor/stator signal transmission/reception interface 70 is provided on the side of the spindle motor 60 in the foregoing description, it is also provided on the opposite side, that is, on the side of the protrude portion 240 of the turntable 210. In this case, the electric conductive part 211 is connected to the rotor/stator signal transmission/reception interface 70 (electrical, optical or electromagnetic) provided on the protrude portion 240 via an electric path inside or along the turntable 210 and the similar interface 70 is provided at the portion facing the interface 70 provided on the protrude portion 240.

The electrical conductive part 20 formed on the optical disk surface may be a mere electrical conductive film, and it can thus be readily formed by deposition. Also, it is possible to apply the electrical conductive film on the surface and also possible to form the thin conductive film in any other method than the deposition. For example, as the arrangement of formation of electrical conductive parts on both surfaces of the optical disk, an electric conductor such as a metal member may be buried in the optical disk such that it penetrates the clamp part thereof and slightly provided from each surface.

As described above, the electronic circuit 10 connected to the electrical conductive part 20 of the optical disk 100 may be formed on any locality of the optical disk, but in view of the balance of the optical disk it is preferably formed at a position as close to the optical disk center as possible. It is also possible to have the electrical conductive part 20 as electronic circuit. The electronic circuit 10 may be formed as a thin-film semiconductor IC chip, or it may be formed inside the disk in the process of disk manufacture.

The inner peripheral part of the optical disk 100 with the electrical conductive part 20 formed thereon, is usually used as the sole clamp locality. By using a transparent electrode as the electrical conductive part (electrode) 20 formed on the inner peripheral part, the function of the transparent part can be maintained.

Figure 6:
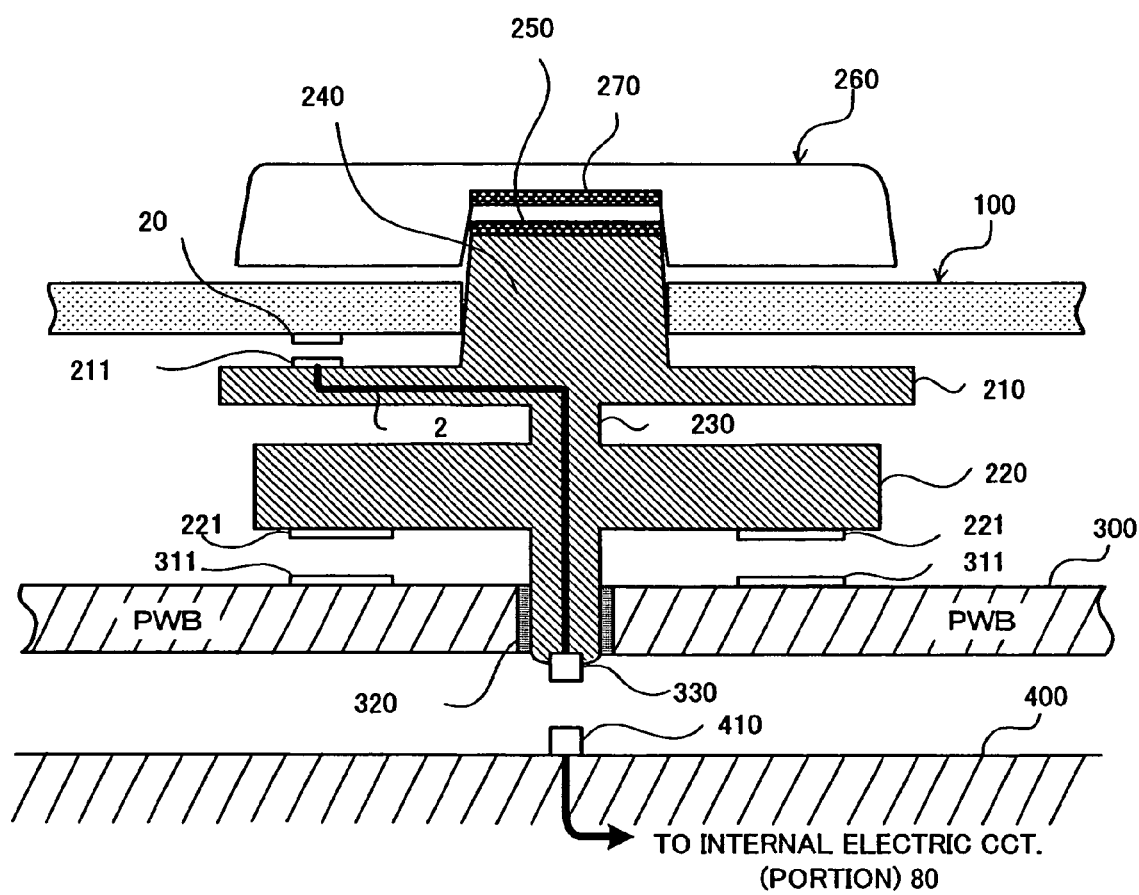
FIG. 6 is a schematic fragmentary sectional view for describing the arrangement of an optical disk drive device according to another embodiment of the present invention.

FIG. 6 is a schematic fragmentary sectional view for describing the arrangement of an optical disk drive device as a different embodiment of the present invention.

In the disk drive device 200 shown in FIG. 5, the spindle motor 60 for rotating the turntable 210 is shown as an independent motor, and the turntable 210 is rotated by rotating the shaft 230 of the motor. The spindle motor 26, however, generally represents a means for rotating the turntable 210, and may have an arrangement having a stator and a rotor; for instance, it may be a flat rotational drive mechanism currently broadly used for disk rotation. The FIG. 6 is based on such an embodiment.

In the rotational drive mechanism as spindle motor shown in FIG. 6, a disk-like rotational drive part 220 which is rotatable in union with the turntable 210 via the shaft 230 has a plurality of magnetic poles 221 formed on a peripherally outer part of a disk-like rotational drive part 220, and a substrate 300 which is secured to the side of a housing bottom 400 has a magnetic pole 311 facing the magnetic poles 221. The polarity of the magnetic pole 311 is controlled by a control circuit formed on the substrate 300 for causing rotation of the rotational drive part 220 and the turntable 210 in the peripheral direction according to the polarity relation between the poles 211 and the pole 311.

Referring to FIG. 6, like FIG. 5, the turntable 210 has a central protrude portion 240, on which the central hole 40 of the optical disk 100 can be fitted. The optical disk 100 is set on the turntable 210 by fitting the central hole 40 of the disk on the protrude portion 240. The protrude portion 240 has a permanent magnet 250 provided at the top. The turntable 210 has an electrical conductive part 211 formed on a predetermined surface locality such as to face the electrical conductive part 20 of the optical disk 100. The clamp 260 having a magnetic part 270 is disposed over the optical disk 100, and by bringing the clamp 260 closer to the optical disk 100 having set on the turntable 210, close contact of the clamp 260 and the turntable 210 to each other via the optical disk 100 by the magnetic force of the permanent magnet 250. Thus, the optical disk 100 is concentrically held and clamped (i.e., chucked) and driven for rotation with the rotation of the shaft 230 of the spindle motor, and the electrical conductive part 20 of the optical disk 100 and the electrical conductive part 211 of the turntable 210 on the side of the disk drive device 200 are held in close contact with each other by magnetic forces, that is, they are sufficiently electrically connected to each other.

As described before, the electrical conductive part 211 on the side of the disk drive device 200 may be electrically connected to the internal electric circuit (i.e., signal processing circuit) 80 shown in FIG. 5 in any desired arrangement. In this embodiment, the shaft (i.e., extension portion) penetrating the substrate 300 has an electric or optical connecting part 330 provided at the lower end of the center of rotation (i.e., axis of rotation). Also, the housing bottom 400 underneath the substrate 300 likewise has an electric or optical connecting part 410 provided at a position facing the electric or optical connecting part 330. The shaft 230 is freely rotatable via a bearing part 320 within the substrate 300.

By having the electric or optical connecting parts 330 and 410 such that they can be electrically connected, an electric connecting arrangement can be obtained, while having them such that they can be optically coupled, an optical connecting arrangement can be obtained. The electric connecting arrangement may be either connection by direct contact or connection based on radio signal transmission and/or receipt. In the case of the radio signal transmission and/or receipt, the electric or optical connecting parts 330 and 410 may each be provided with a radio circuit and an antenna. In the case of obtaining the optical connecting arrangement, the electric or optical connecting parts 330 and 410 may each be provided with an electric/optical transducer part. By disposing these parts face to face as in this embodiment, efficient signal transmission and/or receipt are obtainable.

In the FIG. 6 embodiment, the electric wiring from the electrical conductive part 211 on the turntable 210 in the disk drive device 200 to the electric or optical connecting part 330 may be made with an exclusive lead as shown by bold line, whereby electric wiring from the electric or optical connecting part 410 to the internal electric circuit 80 is obtainable.

In the FIG. 6 embodiment, the electrical conductive part 211 on the side of the disk drive device 200, which is connected to the electrical conductive part 20 of the optical disk 100, is provided on the side of the turntable 210, but it may be provided on the side of the clamp 60 as well. In this case, it is possible to provide the top surface of the optical disk 100 with an electrical conductive part electrically connected to the electronic circuit 10 and also provide the clamp 260 in a locality thereof facing and to be in contact with this electrical conductive part with another electrical conductive part. Alternatively, it is possible to provide a suitable locality of the permanent magnet 250 and the magnetic part 270 to be in close contact with the permanent magnet 250 with respective electrical conductive parts facing each other. As the electrical conductive part on the side of the clamp 260, an electric or optical connecting part as noted above may be provided on the casing top (not shown).

Figure 7:
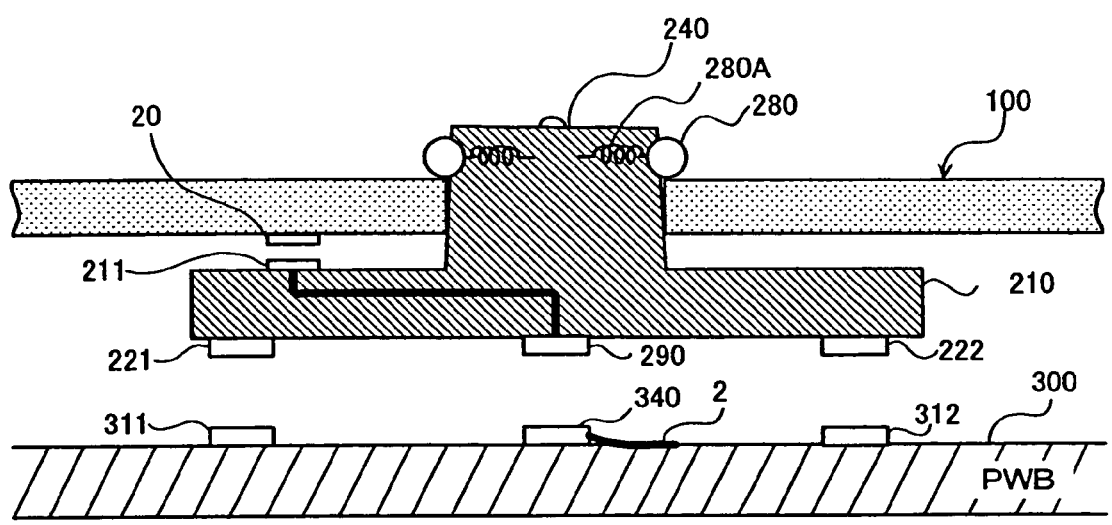
FIG. 7 is a schematic fragmentary sectional view for describing the arrangement of an optical disk drive device according to other embodiment of the present invention.

FIG. 7 is a schematic fragmentary sectional view for describing the arrangement of a further embodiment of the optical disk drive device according to the present invention.

In this embodiment, clamp pins 280 for clamping (or holding) the disk 100 is used in lieu of the clamp 260 in the disk drive device 200 shown in FIG. 5 or 6. Specifically, the protrude portion 240 of the turntable 210 are provided with a plurality of (for instance three) clamp pins 280 in circumferential spacing. The clamp pins 280 are provided circumferentially with respect to the side surface of the protrude portion 240 and biased radially outward by springs 280A. The optical disk is pushed down and secured in position against the spring forces. More specifically, the disk 100 is secured in position on the turntable 210 by pushedly fitting the central hole 40 of the disk 100 down on the protrude portion 240 against the clamp pins 280. The disk drive device 200 having such an arrangement, unlike the one shown in FIG. 5 or 6, is free from the clamp 260, the arrangement is simplified and made thinner, which is desired in view of the cost reduction and size reduction, thus finding applications to small-size electronic devices such as note type personal computers. The remaining arrangement in the FIG. 7 case may be the same as in the FIG. 5 or 6 arrangement, and its detailed description is not given. In this embodiment, the signal transmission and/or receipt between the electrical conductive part 211 in the turntable 210 and the substrate 300 can be carried out via connecting parts 290 and 340 like the electric or optical connecting parts 330 and 410. Of course, the clamp pin 280 is one of the clamp means and it is possible to form the electric conductive part on the clamp pin 280 and the most-inside portion of the opening 40 of the disk for establishing the electrical connection between the disk side and the disk drive device side.

Figure 8:
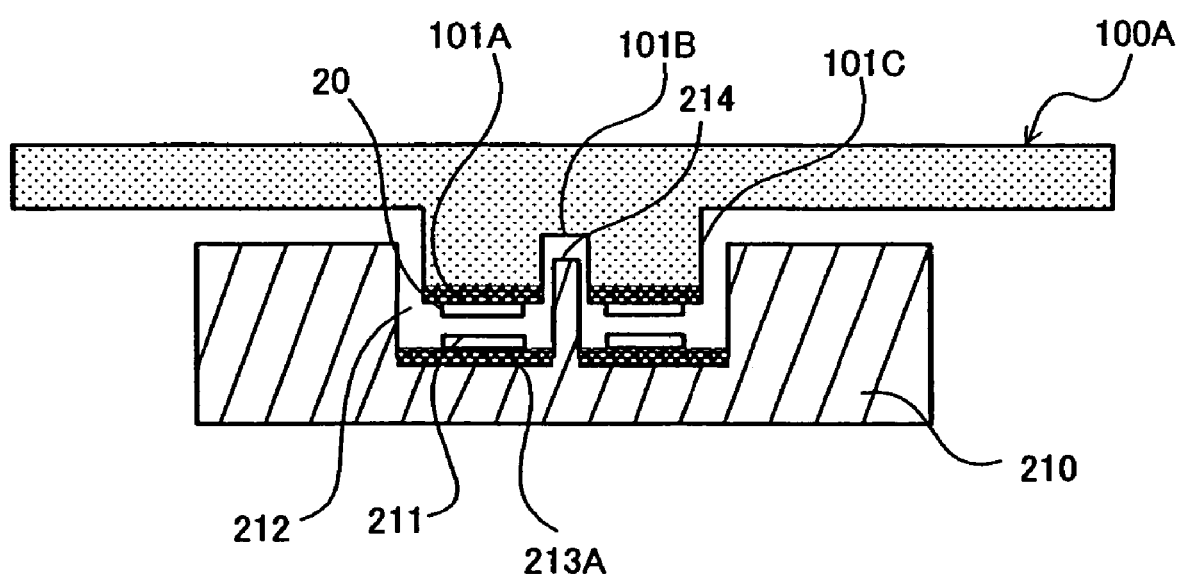
FIG. 8 is a schematic fragmentary sectional view for describing the arrangement of an optical disk drive device according to still other embodiment of the present invention.

FIG. 8 is a further embodiment of the present invention applied to a disk drive device usable for MO or FD disks. In this embodiment the turntable 210 has a central recess 212, and the MO or FD disk 100A and the turntable 210 are positioned to each other by fitting a protrude portion 101C of the disk in the recess 212 and inserting a projection 214 provided on the turntable 210 at a central position thereof in a recess 101B provided in the disk 100A at a central position thereof.

The turntable 210 has a permanent magnet 213A provided in the recess 212, and the MO or FD disk 100A has a magnetic member 101A provided on the protrude portion 101C. The disk 100A and the turntable thus can be held in close contact with each other by their magnetic forces. In this way, the MO or FD and the like disk 100A secured in position of the turntable 210 is driven for rotation. The turntable 210 has the electrical conductive part 211 formed on the permanent magnet 213A provided in the recess 212, and the electrical conductive part 20 is provided on the upper layer part of the magnetic member 101A provided on the protrude portion 101C of the MO or FD disk, and thus the electric contact relation of the electrical conductive parts 20 and 211 with each other is established when they are in the state of close contact with each other. The remaining arrangement such as the mechanism for rotating the turntable 210 and the electric wiring part leading from the electrical conductive part 211 is the same as in the above embodiments, and is hence neither shown nor described.

In the above description, only a single electronic circuit is formed on the disk, but in some cases a plurality of electronic circuits are formed on one side or both sides of the disk. Also, in some cases power is externally supplied to the electronic circuit. In such cases, it is necessary to form a corresponding signal transfer path (including power) with respect to the external part (i.e., the disk drive device side).

In this embodiment, for meeting such demand a plurality of electrically separate electrical conductive parts connected to the corresponding electronic circuits or circuit formed on the disk, and likewise a plurality of electrically separate electrical conductive parts are formed on the clamp, the turntable or the like on the side of the disk drive device in localities thereof corresponding to the above plurality of electrical conductive parts when the disk is held in contact. The disk and the disk drive device are thus electrically connected via these electrical conductive parts to each other.

The electrical conductive parts formed on the disk and disk drive sides, as shown in FIGS. 1 to 5, may have any size and shape. However, in view of the position matching with the connecting part on the disk drive device and on the disk side thereof, arrangements as described hereinunder are desirable for or obtaining reliable electric contact.

As the electrical conductive part a plurality of concentric annular or arcuate electrical conductive parts are preferably formed circumferentially in a radially electrically separate state. As the contact part on the disk drive device side with respect to the disk (such as the clamp or the turntable), a plurality of concentric annular or arcuate electrical conductive parts are preferably formed circumferentially at the corresponding positions in a radially electrically separate state. In this way, by obtaining the correspondence relation with respect to the radial positions, reliable electric contact can be obtained.

Specifically, the electrical conductive parts on the contact part (such as the clamp or the turntable) on the disk drive device side with respect to the disk are desirably have an annular or arcuate shape for obtaining their ready and reliable contact with the disk side electrical conductive parts. Further, the width and circumferential dimension of the annular electrical conductive parts are preferably made greater than those of the disk side electrical conductive parts. Conversely, the disk drive device side electrical conductive parts may be formed to have a circumferentially limited dimension as shown in FIGS. 1 to 4, and the disk side electrical conductive parts formed at the corresponding positions may be formed to have an annular or arcuate shape.

Figure 9:
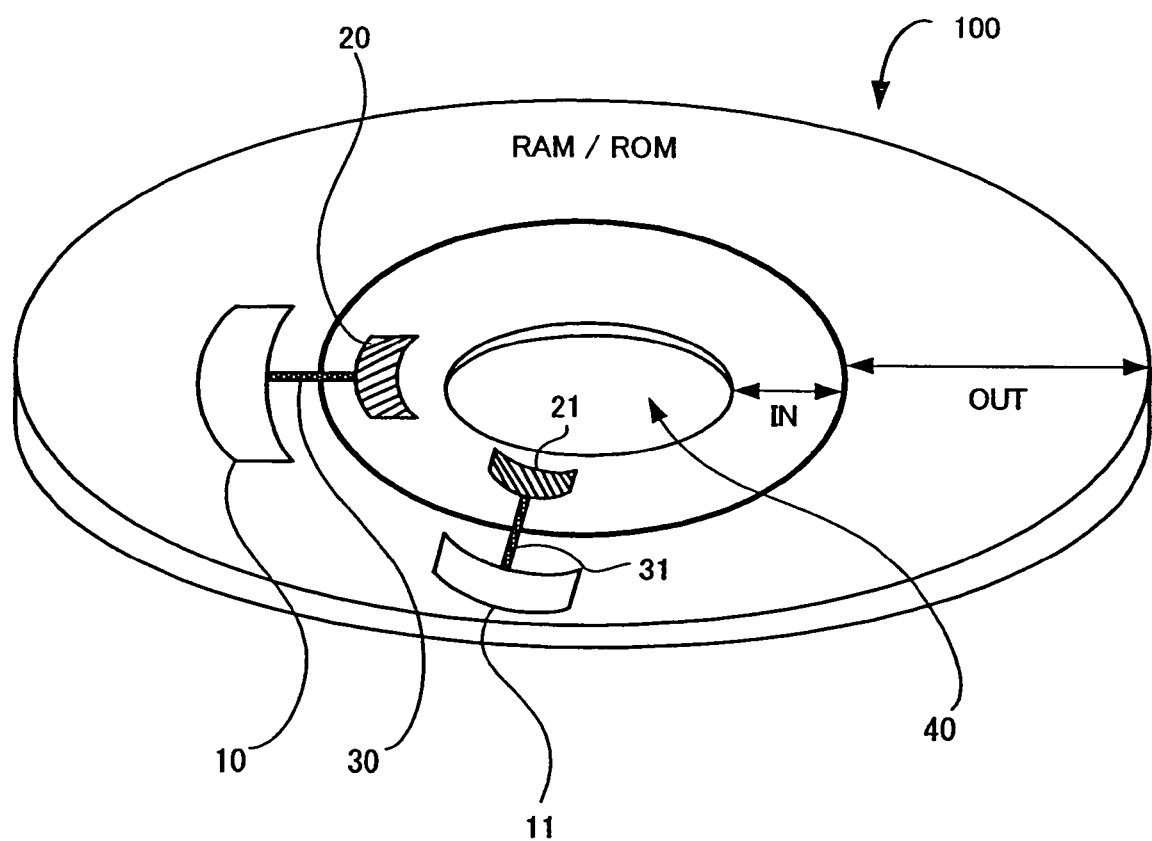
FIG. 9 shows schematic plan view of an optical disk according to other embodiment of the present invention.

FIG. 9 shows electrical conductive part formation on disk embodying the present invention. In this embodiment, two electronic circuits 10 and 11 are formed. Electric conductive parts 20 and 21 which are electrically connected via electric connecting parts 30 and 31 to the electronic circuits 10 and 11, respectively, are formed at radially different positions. In this case, the electrical conductive parts on the disk drive device side contact part (such as the clamp, turntable, etc.) with respect to the disk have their radial position and width set such that they are free from contact with the electrical conductive parts formed on the disk in radially different localities (that is, free from contact with two or more electrical conductive parts on the disk). The clamp area may be the same as in the FIGS. 1 to 4 embodiments, and is not particularly illustrated.

Figure 10:
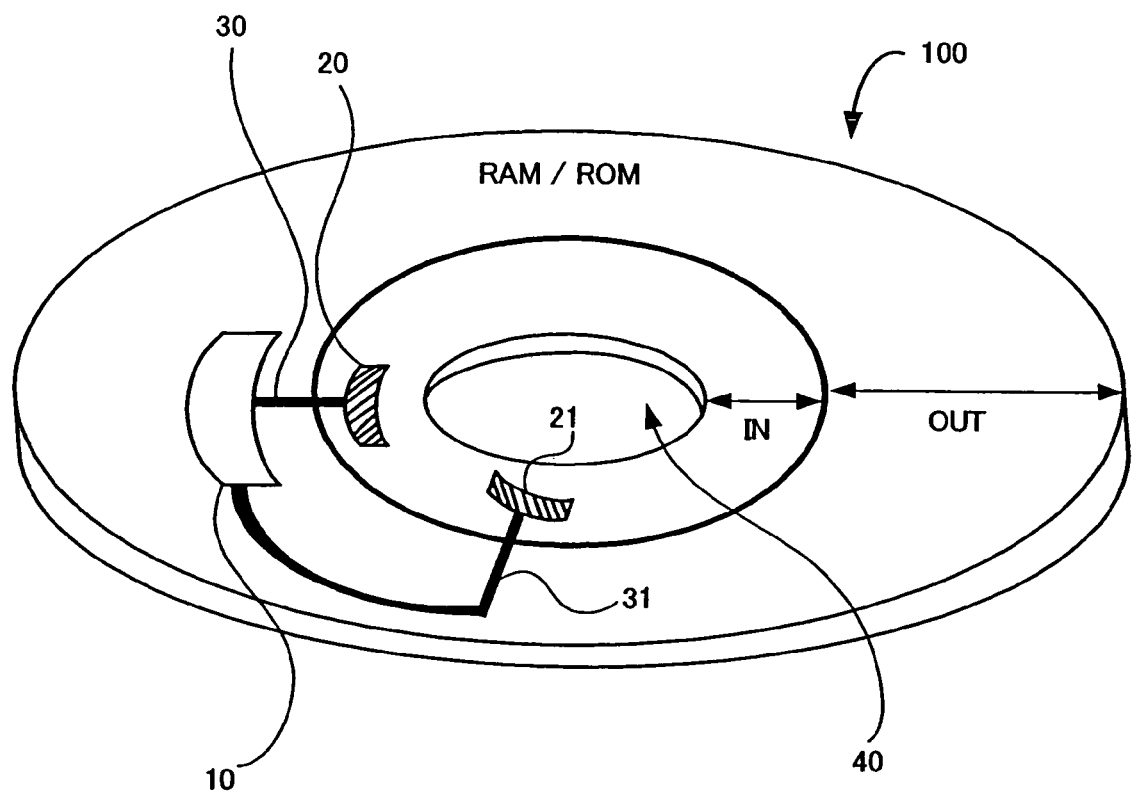
FIG. 10 shows schematic plan view of an optical disk according to still other embodiment of the present invention.

FIG. 10 shows a further embodiment, in which a power necessary for operating the electronic circuit 10 is supplied via the electrical conductive part 21 and the connecting part 31 to the electronic circuit 10. In this embodiment, the power is always supplied even during disk rotation via the electrical conductive part 21 and the connecting part 31 to the electronic circuit 10 of the disk. Since the power is free from any noise problem, the power can be supplied from the disk drive device side or externally without any problem irrespective of contact with the rotational part. Thus, power can be supplied relatively easily. The electronic circuit 10 may have a battery capable of being charged by the electric power supply via the electric conductive part 21.

Figure 11:
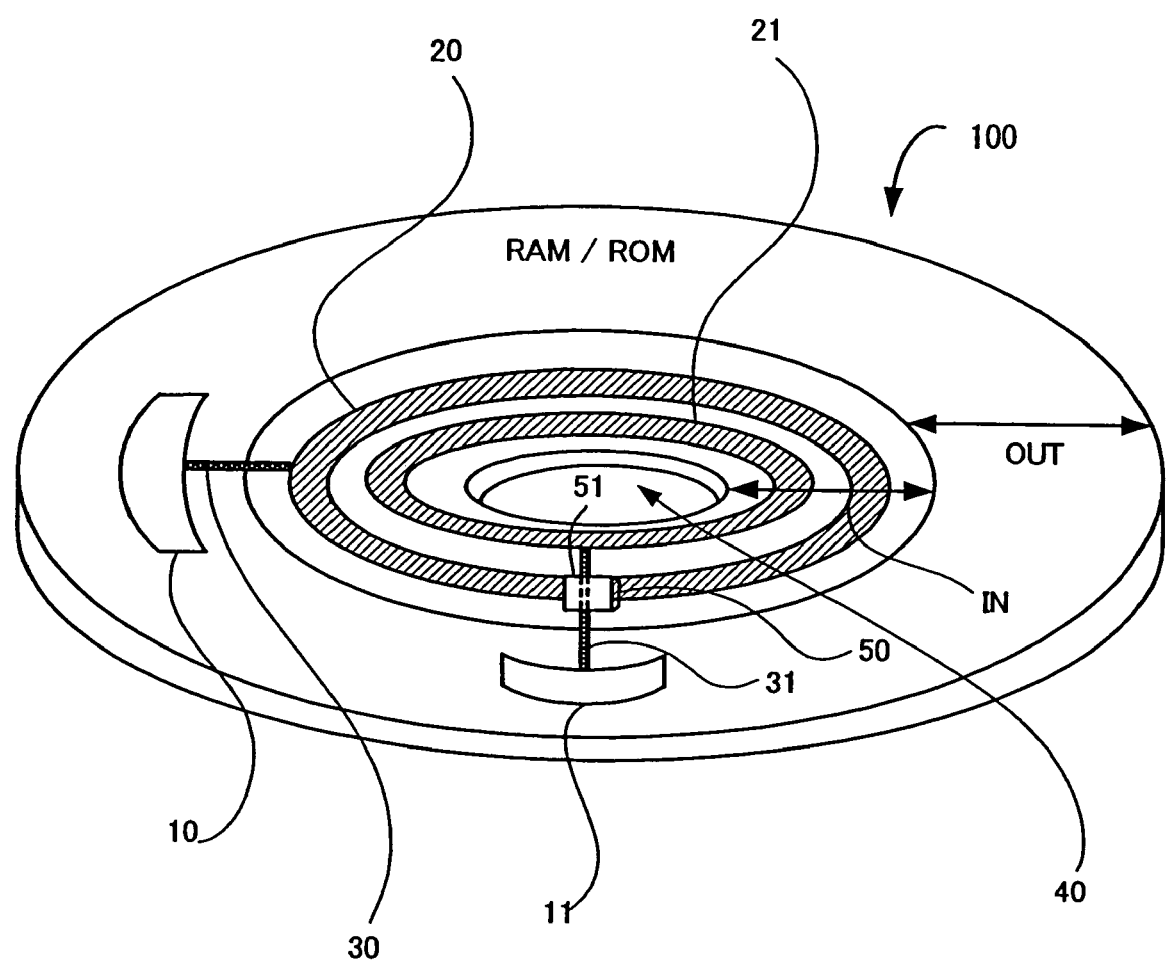
FIG. 11 shows schematic plan view of an optical disk according to further embodiment of the present invention.

FIG. 11 shows a further embodiment, in which a plurality of (i.e., two in this embodiment) electrical conductive parts 20 and 21 are formed on the disk in an annular or arcuate form with a predetermined width and in a radially spaced-apart relation to one another. In this case, the electrical conductive parts formed on the disk drive device side contact part (such as the clamp or the turntable) with the disk are set in width and position such that they can be in contact with the sole corresponding electrical conductive parts on the disk side. In this embodiment, the inner electrical conductive part 21 requires wiring of a connecting part 31 for connection to the electronic circuit 11 by striding the outer electrical conductive part 20. In this FIG. 11 embodiment, an insulating film 50 is formed on the stridden electrical conductive part 20 (in the outer electrical conductive part), then the wiring (i.e., r part) 31 is formed on the insulating film 50, and a further insulating film 51 is formed on the wiring 31.

Figure 12:
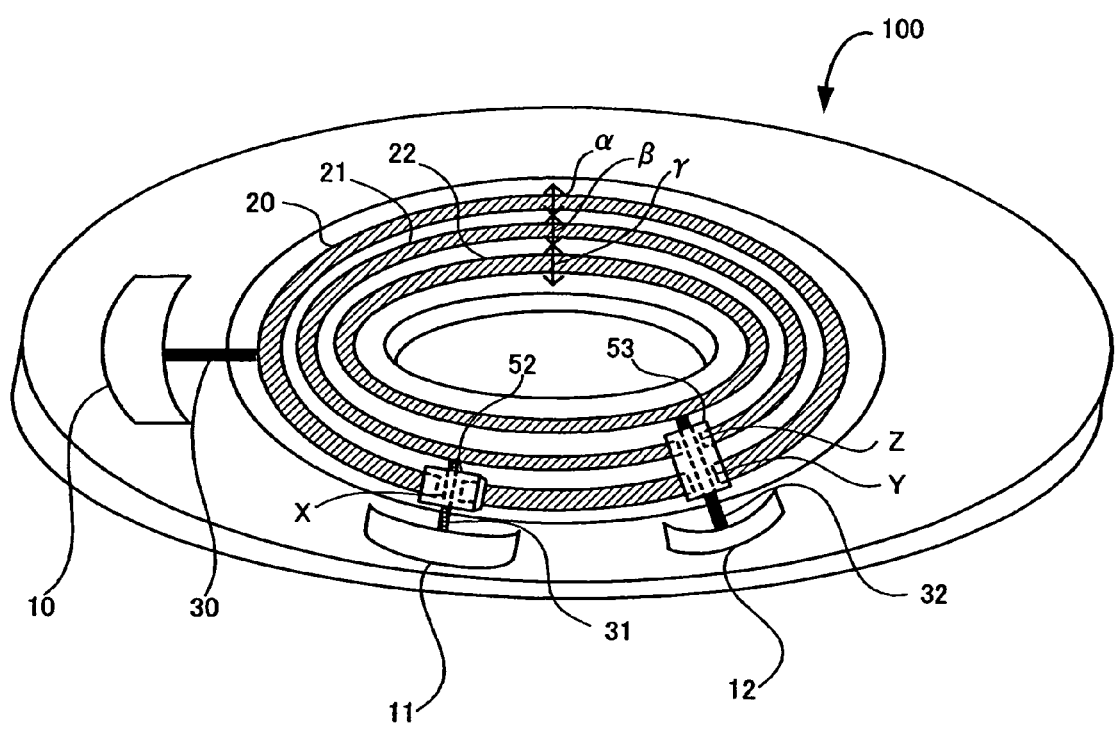
FIG. 12 shows schematic plan view of an optical disk according to still further embodiment of the present invention.

The annular electrical conductive parts need not be fully circumferentially continuous. In this case, by removing a part of the outer electrical conductive part (i.e., forming a part free from the electrical conductive part) and disposing in this part a connecting part leading from the inner electrical conductive part, no insulating film need be formed. FIG. 12 shows such an embodiment. In this embodiment, three electronic circuits 10 to 12 are formed on the disk 100, on which three annular electrical conductive parts 20 to 22 are also formed one on the inner or outer side of another. The outermost electrical conductive parts 20 is formed with removed parts X and Y free form itself, and the middle electrical conductive part 21 is formed with are moved part Z. The outermost electrical conductive part 20 is connected via a connecting lead part 30 to the electronic circuit 10.

A connecting lead part 32 is led from the innermost electrical conductive part 22 across the removed parts Z and Y to the electronic circuit 12. A connecting lead part 31 led from the middle electrical conductive part 21 across the removed part X to the electronic circuit 11. Insulating films 52 and 53 are formed on the connecting lead parts 31 and 32 in order to prevent the contact thereof with the electrical conductive parts on the clamp above the disk 100 other than the corresponding ones.

In this and also the following cases, the electrical conductive parts formed on the disk drive device side contact part (such as the clamp, the turntable, etc.) with respect to the disk, are set in width and position, such that they will not be in contact with the radially spaced-apart annular electrical conductive parts on the disk other than the corresponding ones. For this reason, the three connecting parts on the disk drive device side with respect to the disk are positioned in radial direction ranges of α, β and γ, respectively.

Figure 13:
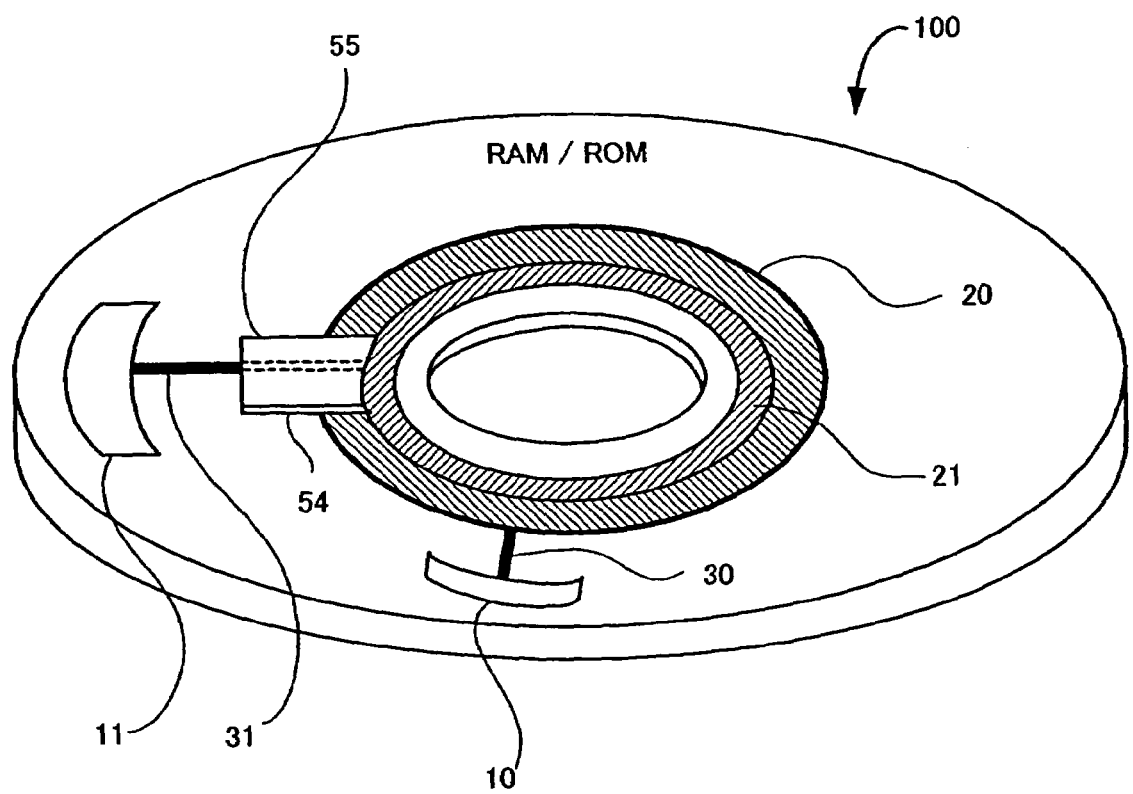
FIG. 13 shows schematic plan view of an optical disk according to other embodiment of the present invention.

FIG. 13 shows a further embodiment. In this embodiment, the optical disk 100 has a wide annular outer electrical conductive part 20, and it also has an insulating film (not shown) formed adjacent to the outer electrical conductive part 20 and an inner electrical conductive part 21 formed on the insulating film. A connecting lead part 31 led from the inner electrical conductive part 21 is formed on an insulating film 54 formed on the insulating film and connected to an electronic circuit 11. Here again, an insulating film 55 is formed on the connecting lead part 31. The electronic circuit 10 and the electrical conductive part 21 are connected via the connecting part 30 to each other.

As an alternative, it is possible to provide such an arrangement that the electrical conductive parts on the disk and disk drive device sides are held in contact with each other when the turntable is stationary. In this case, it is possible to charge the battery formed on the disk at the time of the stationary state and also permit transmission and/or receipt of signals in the electronic circuit. Specifically, instead of the power supply via separately disposed rotor/stator signal transmission reception interfaces 70 (330, 410) as shown in FIG. 5 (FIG. 6), it is possible to arrange such that at the time of the battery charging the disk is not rotated to directly connect an external power supply to the electrical conductive part of the disk drive device for the transmission and/or receipt of signals with the electronic circuit.

In this embodiment of the disk drive device, preferably an annular electrical conductive part is formed on the contact part (i.e., the clamp, the turntable, etc.) of the disk drive device side with the disk for ensuring ready and reliable contact with the electrical conductive part of the disk. Also, preferably the annular electrical conductive part is set to be greater in the width and the circumferential dimension than the electrical conductive part of the disk.

As described above, in the case of forming a plurality of electronic circuits on the disk, corresponding electrical conductive parts are formed on the disk drive device side connecting part (i.e., the clamp, the turntable, etc.) with respect to the disk for electric connection to the electronic circuits, respectively. Specific embodiments corresponding to the FIGS. 6 to 10 embodiments will now be described.

Figure 14:
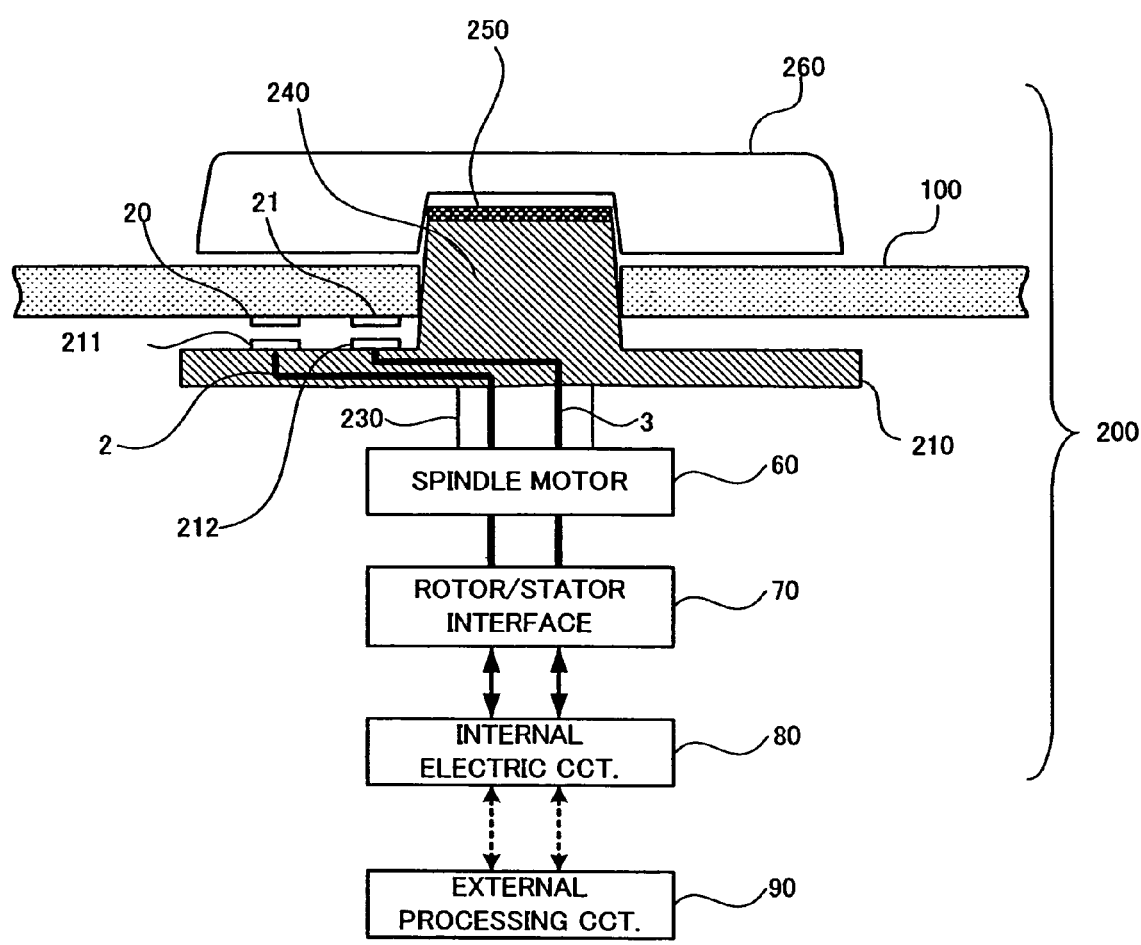
FIG. 14 is a schematic fragmentary sectional view of the turntable and clamp for describing the arrangement of an optical disk drive device according to still other embodiment of the present invention.

FIG. 14 is a schematic view showing the neighborhood of the turntable and the clamp in a disk drive device, which is based on the FIG. 5 embodiment for the sake of three brevity of description. This case is of course applicable to the FIGS. 6 to 8 embodiments likewise.

Referring to FIG. 14, in the FIG. 5 embodiment (with the two electronic circuits 10 and 11 formed on the disk, the turntable 210 as the contact part of the side of the disk drive device 200 with the disk 100 is formed at radially different localities with electrical conductive parts 211 and 212 such as to face the electrical conductive parts 20 and 21 formed on the disk at different positions. In this case, the electrical conductive part 212 is formed such that it is in contact with the sole electrical conductive part 21 and not in contact with the other electrical conductive part 20. The signal transmission route from the electrical conductive part 212 to the internal electric circuit 80, may be like those in the FIGS. 5 and 6 cases. More specifically, a lead from the electrical conductive part 212 is connected via an electric or optical connecting part 330A (not shown) like the electric or optical connecting part 330 and an electric or optical connecting part 410A facing the electric or optical connecting part 320A to the internal electric circuit 80.

In the case of supplying power to the electronic circuit as shown in FIG. 10, the arrangement as shown in FIG. 14 is adaptable, and the power is supplied to the electrical conductive part 212 on the disk drive device side and the electrical conductive part 21 of the electronic circuit 10 on the disk. In the case where a chargeable battery is provided on the disk, it is possible to arrange such that the power is supplied again via the electrical conductive parts 212 and 21 to the battery. Power supply is further possible even when the disk is not rotating but stationary by arranging such that both the electrical conductive parts are forcedly contacted with each other. By so doing, it is possible to charge the battery while the disk is stationary.

In the case of a disk drive device corresponding to the FIG. 9 to 13 embodiments with annular electrical conductive parts formed on the disk formed with predetermined width and radially spaced-apart relation to one another, a plurality of electrical conductive parts may be formed in predetermined width, position, shape, etc., on the turntable 210 of the disk drive device such that they can be in contact with only corresponding disk side electrical conductive parts, respectively.

While in the above embodiment the connecting parts are provided each on each of the disk drive side electrical conductive parts, it is possible to simplify the arrangement by forming only a single connecting part and multiplexing signals in a plurality of electrical conductive parts for transmission and/or receipt via the single connecting part.

The electric conductive parts on the disk and disk drive device sides may have any position, shape and size.

As has been described in the foregoing, while in the prior art only optical disk side data is readout by receiving reflected laser beam in response to the laser beam emission, according to the present invention the optical disk surface is formed with an electronic circuit and an electric conductive part connected thereto or serving as an electronic function part for generating some signal data, whereby the electric data can be transmitted and/or received via the electrical conductive parts on the optical disk side and the disk drive device side.

A different arrangement is also possible, in which data obtained from the electronic circuit on the disk is processed in an external signal processing unit such as a personal computer and the signal obtained in the signal processing circuit is written in the optical disk.

In the disk drive device according to the present invention the turntable and clamp are not essential prerequisites, and generally the present invention is applicable to any disk drive device, which can hold or clamp and rotate the disk.

Furthermore, for obtaining reliable state of contact and connection between the electrical conductive parts, a plurality of electrical conductive parts may be disposed in a spaced-apart relation to one another, non-flat surface electrical conductive parts may be formed, electrical conductive parts themselves may includes an elastic material and/or non-slippable material, or an elastic material may be disposed one electrical conductive parts.

The position, shape, size, etc. of the electrical conductive parts on the disk side and the disk drive device side, may be determined such as to obtain reliable mutual contact when the disk is held by contact. To this end, obviously any arrangement not limited to the above embodiments may be used.

In the foregoing, the arrangements of the preferred embodiments of the disk drive device and the disk according to the present invention have been described. However, it is to be readily understood that these embodiments are merely exemplary and have no sense of limiting the present invention, and a person skilled in the art many various changes and modifications depending on particular applications without departing from the scope of the present invention. Specifically, the present invention is by no means limitative to the disk drive devices and disks described before in connection with the embodiments, and the present invention is also applicable to a rotor and a rotational mechanism in a rotational mechanism for holding (or clamping) the rotor in contact therewith and rotating the same. Although specific arrangements and advantages are not given to avoid duplication, the present invention has the following basic arrangements. Also, by providing the disk and the hold part on the disk drive device side rotatable in union with the disk with separate communication means (such as optical or radio means), even with high speed rotation of the disk and the hold part the relative speed difference is zero, and communication between the two can be readily obtained.

A first example of a signal transmitting/receiving device with respect to a driven rotor, wherein: the driven rotor is formed with an electronic circuit and an electronic function part and an electric conductive part electrically connected to the electronic circuit or the electronic function part; a rotational drive part for holding the driven rotor in contact therewith and driving the driven rotor for rotation is formed in a locality thereof for holding the driven rotor in contact therewith with an electric conductive part to be in contact with the electric conductive part formed on the driven rotor; and transmission and/or receipt of signals between the driven the rotor and the rotational drive part via the electrical conductive parts on the driven rotor and the rotational drive part in contact with each other.

A second example of a signal transmitting/receiving device with respect to the driven rotor, wherein: the driven rotor is formed with a plurality of electronic circuits or electronic function part and electrical conductive parts electrically connected to the plurality of electronic circuits or electronic function parts, respectively; a rotational drive part for holding the driven rotor in contact therewith and driving the driven rotor for rotation is formed in a locality thereof for holding the driven rotor with electrical conductive parts to be in contact with the plurality of electrical conductive parts formed on the driven rotor; and transmission and/or receipt of signals between the driven rotor and the rotational drive part via the electrical conductive parts on the driven rotor and the rotational drive part in contact with one another.

According to the present invention, it is possible to permit reliable transmission and/or receipt of signals between disk and disk drive device, thus permitting not only reliable transmission and/or receipt of electric signals between the disk and an external device, i.e., reading and writing of data from and in the disk, but also transmission and/or receipt of signals between a plurality of electronic circuits including any electronic or electronic function such as processing circuit and memory formed on the disk and the external circuit with a simple arrangement. Also, it is possible to realize reliable power supply to a battery formed on the disk. Thus, it is possible to prescribe peculiar operations based on the function of the electronic circuits formed on the disk and thus greatly improving the property of expansion in the fields utilizing the disk. Consequently, a disk which features an extremely expanded scope of applications, is obtainable with a minimum cost increase by merely forming, on the surface of a usual disk, a thin film IC or like electronic circuit and a thin film or like electric conductive part electrically connected to the electronic circuit. Furthermore, a disk drive for accessing such a disk is obtainable by merely adding a simple arrangement, and it is thus possible to obtain a disk drive device with a minimum cost increase. The above advantages are pronounced in case of using an optical disk, which permits a great memory capacity to be obtainable although being inexpensive in price. These advantages are obtainable not only mechanism between the disk and the disk drive device but also mechanism between a rotational member and a rotating device for holding and driving it for rotation.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A disk drive system for clamping or holding a disk and for rotating the disk with a damper or holder, wherein the disk has an electronic function element and a first electrical conductive surface electrically connected to the electronic function element, the disk drive system comprising:
   a disk drive having
      at least one second electric conductive surface being arranged adjacent to a clamped or held portion of the disk and to be electrically connected with the first electrical conductive surface of the disk by pressure of the damper or holder;
      a first conversion means being connected with the at least one second electric conductive surface and disposed at the substantial center of the axis of rotation of the disk; and
      a second conversion means facing the first conversion means and disposed at the substantial center of the axis of rotation of the disk, at a stationary disk drive section,
   wherein signal transmission is facilitated between the electronic function element of the disk and the stationary disk drive section through the first electrical conductive surface of the disk, the at least one second electric conductive surface, the first conversion means, and the second conversion means.

2. The disk drive system according to claim 1, wherein at least one of the first and the at least one second electric conductive surface is formed in shape of line, arcuate or annular shape.

3. The disk drive system according to claim 1, wherein the electronic function element is formed on a part on an inner side of the disk other than a part to be clamped or held.

4. The disk drive system according to claim 1, wherein the electronic function element is formed on a part on an outer side of the disk other than a part to be clamped or held.

5. The disk drive system according to claim 1, wherein the disk includes a program storage part, in which program for prescribing the operation of the electronic function element is stored.

6. The disk drive system according to claim 1, wherein at lease one of the first and the at least one second electrical conductive surface is constituted by a plurality of spaced-apart electrical conductive surfaces which are electrically connected.

7. The disk drive system according to claim 1, wherein the first electrical conductive surface on the disk is formed on the same surface as a surface including optical data storage area.

8. The disk drive system according to claim 1, wherein the first electrical conductive surface on the disk is formed on the surface opposite to a surface including optical data storage area.

9. The disk drive system according tb claim 1, wherein at least one of the first and the at least one second electrical conductive surface is formed by thin layer.

10. The disk drive system according to claim 1, wherein the electrical conductive surface is formed from a transparent material.

11. The disk drive system according to claim 1, wherein at least one of the first and the at least one second electrical conductive surface has a non-flat surface.

12. The disk drive system according to claim 1, wherein at least one of the first and the at least one second electrical conductive surface has an elastic material and/or non-slippable material.

13. The disk drive system according to claim 1, wherein the disk is an optical disk.

14. The disk drive system according to claim 1 wherein the first conversion means and the second conversion means are electrical means.

15. The disk drive system according to claim 1 wherein the first conversion means and the second conversion means are optical means.

16. The disk drive system according to claim 1 wherein the first conversion means and the second conversion means are radio means.

* * * * *